United States Patent
Savant et al.

(10) Patent No.: US 11,879,279 B2
(45) Date of Patent: Jan. 23, 2024

(54) MOTORIZED DOOR LEAF HANDLE FOR A MOTOR VEHICLE

(71) Applicant: U-Shin Italia S.p.A., Pianezza (IT)

(72) Inventors: Marco Savant, Pianezza (IT); Antonino Cannavo, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 572 days.

(21) Appl. No.: 17/115,880

(22) Filed: Dec. 9, 2020

(65) Prior Publication Data
US 2021/0172216 A1 Jun. 10, 2021

(30) Foreign Application Priority Data
Dec. 9, 2019 (EP) .................................. 19214502

(51) Int. Cl.
*E05B 81/76* (2014.01)
*B60R 16/023* (2006.01)
(Continued)

(52) U.S. Cl.
CPC .......... *E05B 81/77* (2013.01); *B60R 16/0239* (2013.01); *E05B 81/04* (2013.01);
(Continued)

(58) Field of Classification Search
CPC .......... E05B 81/77; E05B 81/04; E05B 81/16; E05Y 2400/44; E05Y 2400/86; E05Y 2900/531; B60R 16/0239
See application file for complete search history.

(56) References Cited

U.S. PATENT DOCUMENTS

| | | | | |
|---|---|---|---|---|
| 5,844,470 | A * | 12/1998 | Garnault | ............ G07C 9/00309 |
| | | | | 292/201 |
| 7,108,301 | B2 * | 9/2006 | Louvel | .................... E05B 79/06 |
| | | | | 292/201 |

(Continued)

FOREIGN PATENT DOCUMENTS

| | | |
|---|---|---|
| DE | 102013212198 | 1/2014 |
| GB | 2548146 | 9/2017 |

(Continued)

OTHER PUBLICATIONS

European Search Report for Corresponding EP Application No. 19214502, dated Jun. 2, 2020.

*Primary Examiner* — Victor D Batson
*Assistant Examiner* — Matthew J Sullivan
(74) *Attorney, Agent, or Firm* — Burris Law, PLLC

(57) ABSTRACT

A handle for a motor vehicle door leaf includes a support, lever, gripping element, electric control unit, first detector, and second detector. The gripping element is fixed to the lever. The gripping element is coupled to the support and displaceable relative thereto from a rest position to a deployed position, and from the deployed position to an unblocking position. The first detector is configured to detect a presence of a user and send a first signal to the electric control unit in response. The second detector is configured to detect a displacement of the gripping member from the deployed position to the unblocking position and to send a second signal in response. The electric control unit is configured to control the unlocking of an electric latch in response to the reception of the second signal after reception of the first signal.

18 Claims, 1 Drawing Sheet

Figure 1:
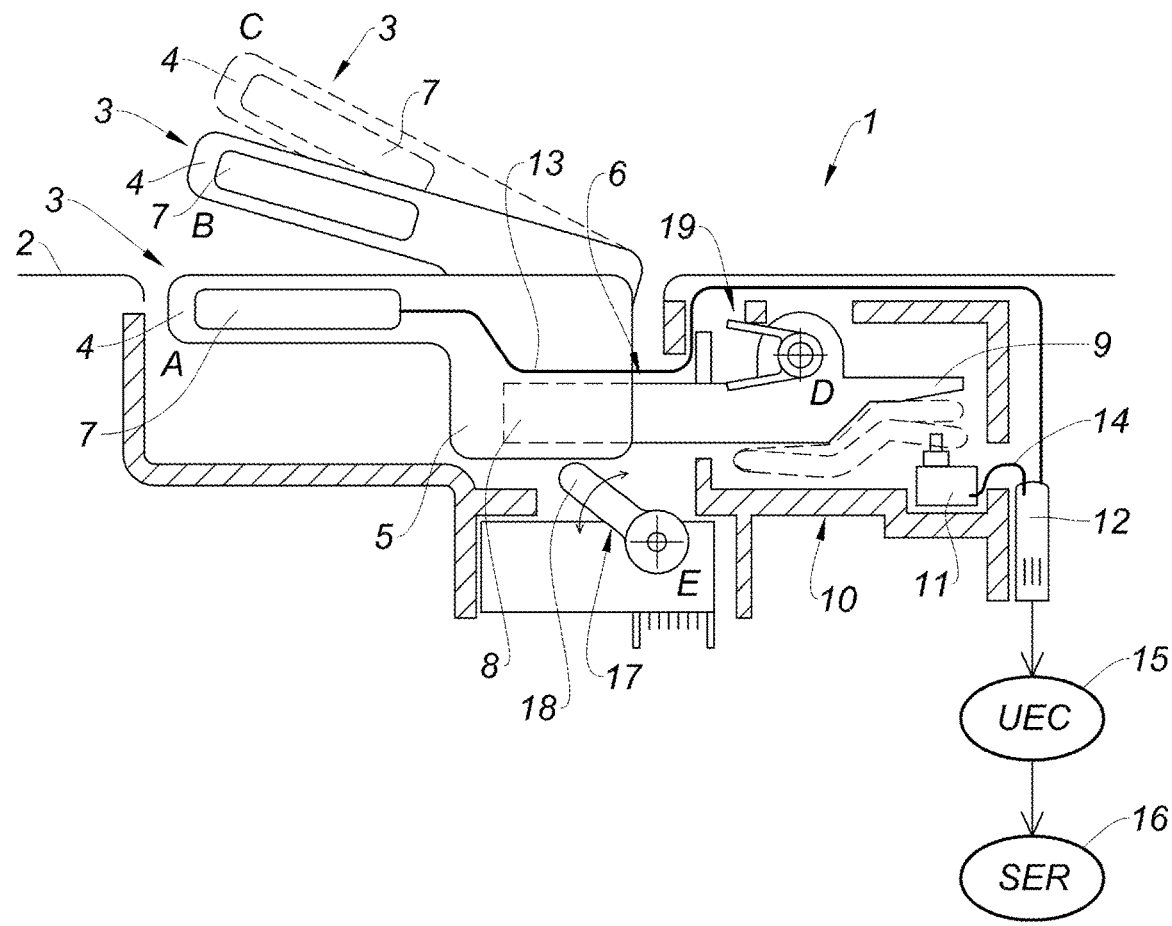

(51) Int. Cl.
  *E05B 81/04* (2014.01)
  *E05B 85/16* (2014.01)
(52) U.S. Cl.
  CPC ........... *E05B 85/16* (2013.01); *E05Y 2400/44* (2013.01); *E05Y 2400/86* (2013.01); *E05Y 2900/531* (2013.01)

(56) References Cited

U.S. PATENT DOCUMENTS

| | | | |
|---|---|---|---|
| 7,173,346 B2 * | 2/2007 | Aiyama | E05B 81/78 |
| | | | 307/9.1 |
| 7,375,299 B1 * | 5/2008 | Pudney | E05B 81/78 |
| | | | 200/61.62 |
| 8,443,553 B1 * | 5/2013 | Polewarczyk | E05B 81/77 |
| | | | 292/DIG. 31 |
| 9,022,436 B2 * | 5/2015 | Wellborn, Sr. | E05B 81/18 |
| | | | 292/336.3 |
| 9,458,649 B2 * | 10/2016 | Fujiwara | E05B 81/56 |
| 10,487,547 B2 * | 11/2019 | Malvy | E05B 81/06 |
| 11,536,060 B2 * | 12/2022 | Takato | E05B 81/77 |
| 2015/0337571 A1 * | 11/2015 | Henderson | B60R 25/252 |
| | | | 292/195 |
| 2016/0123045 A1 * | 5/2016 | Bingle | E05B 81/04 |
| | | | 292/336.3 |
| 2016/0222702 A1 * | 8/2016 | Koizumi | E05B 81/64 |
| 2020/0340287 A1 * | 10/2020 | Nishizuka | B60J 5/06 |
| 2022/0290470 A1 * | 9/2022 | Couto Maquieira | E05B 81/90 |
| 2023/0049181 A1 * | 2/2023 | Couto Maquieira | E05B 79/20 |

FOREIGN PATENT DOCUMENTS

| | | |
|---|---|---|
| WO | 2016151131 | 9/2016 |
| WO | 2017070307 | 4/2017 |

* cited by examiner

MOTORIZED DOOR LEAF HANDLE FOR A MOTOR VEHICLE

CROSS-REFERENCE TO RELATED APPLICATIONS

This application claims priority to and the benefit of EP 19214502.7, filed on Dec. 9, 2019. The disclosures of the above application are incorporated herein by reference.

FIELD

The present disclosure relates to a door leaf handle for a vehicle and a method for unlocking a door leaf including such a handle.

BACKGROUND

The statements in this section merely provide background information related to the present disclosure and may not constitute prior art.

Some vehicles are equipped with a handle recessed in their door. These handles allow obtaining an improved aesthetic effect because they merge with the rest of the door and are therefore very discrete. This type of handle also can improve the aerodynamics of the vehicle when it is moving, thanks to its flush position relative to the vehicle door.

Recessed handles are typically available in mechanical versions and motorized versions.

Door leaf handles conventionally include a support configured to be fixed on the door and a gripping element connected to the support by a hinge. The joint can be horizontal or vertical, which is more common.

The gripping element is movable in rotation or in translation relative to the support between a rest position in which it is positioned substantially parallel to the support and recessed in the door, and an open position of the door in which it is inclined relative to the support and therefore deployed.

The door leaf handles also include a device for actuating the handle housed in the support allowing to bring it into the deployed position.

Such a handle is connected to a latch present on the door of the motor vehicle by a mechanical link, for example by a cable called a Bowden cable. When a user wishes to open the door of the motor vehicle, the user pulls on the gripping element, exerting a force on the Bowden cable and thus unlocking access to the vehicle. This type of mechanical link between the handle and the latch can have a drawback. For example, in case of strong contact with another vehicle and when the gripping element is in its rest or deployed position, the acceleration undergone during such an accident may cause the vehicle door to open even though no traction was exerted on the gripping element and therefore on the Bowden cable.

A handle connected to a latch without Bowden cable has therefore been proposed in GB2548146. This handle includes a gripping element extended with front and rear ends and an outer surface flush with the outer surface of a door in a folded position. The handle includes a curved support arm that slides in a guide along a path defined by the curve of the support arm between the stowed position and the deployed position. The support arm may include a rack driven by a motorized pinion. The gripping element may include a sensor for unlocking the door and displacing the gripping element in response to a signal. The user can further pull the gripping element into a position to open the door.

The set may include a pocket for stowing the gripping element, which may include a latch barrel accessible in case of mechanical failure or a lamp for backlighting the handle. The device also concerns a method allowing to operate a door handle by extending the gripping element to a first deployed position in response to an electronic signal, then by unlocking a latch in response to a mechanical signal. However, an accident of the vehicle may cause the actuation of the sensor and therefore the opening of the door due to the acceleration effect undergone by the vehicle.

The door leaf handle of the present disclosure overcomes these, and other disadvantages associated with typical door leaf handles.

SUMMARY

This section provides a general summary of the disclosure and is not a comprehensive disclosure of its full scope or all of its features.

In one form according to the teachings of the present disclosure, a door leaf handle for motor vehicle includes a support and a gripping element, the gripping element being fixed to a lever and configured to displace from a rest position to a deployed position, and from a deployed position to an unblocking position, the handle including a first detector, the first detector being configured to detect the presence of the user, and configured to send a first signal to an electric control unit in response to the detection of the presence of the user, the handle including a second detector configured to detect a displacement of the gripping element from a deployed position to an unblocking position and to send a second signal in response to the detection of the displacement, the electric control unit being configured to control the unlocking of an electric latch in response to the reception of the second signal after reception of the first signal.

The unlocking of the door leaf can therefore be performed only voluntarily by a user.

The gripping element is configured to displace from the rest position to the deployed position by the detection of a magnetic card or a mobile phone for example in an area close to the vehicle.

The gripping element is configured to be displaced from the deployed position to the unblocking position by a user.

As used herein, "electric control unit" means a specific control unit of the door leaf or a general control unit of the vehicle.

According to one form, the electric control unit is configured to control the unlocking of the electric latch to the extent that the second signal is received within a defined time interval starting from the reception of the first signal.

This ensures a safe opening of the door leaf to the user. If the second signal arrives after the end of the time interval, the unlocking is not triggered.

According to another form, this time interval is less than two seconds. In another form, this time interval is less than one second. In still a further form, this time interval is less than a few milliseconds.

As used herein, a "few milliseconds" mean less than 500 milliseconds and in one form can be less than 20 milliseconds.

According to yet another form, the lever is configured to displace from a passive position, in which an arm of the lever is at a distance from the second detector, to an intermediate position in which the arm is in contact with the second detector, and from the intermediate position to an active position, in which the arm exerts a force on the second detector.

Such an arrangement provides instant processing of the actions transmitted by the user.

Advantageously, the lever arm is configured to displace from the passive position to the intermediate position simultaneously to the displacement of the gripping element from its rest position to its deployed position, and from its intermediate position to its active position simultaneously to the displacement of the gripping element from its deployed position to its unblocking position.

This cooperation between the lever and the gripping element allows the lever arm to be positioned relative to the second receiver according to the exact position of the gripping element.

Further advantageously, the first signal and the second signal are configured to be sent to the electric control unit via an electric connector.

This allows joining the two electric terminals of the first and second receiver.

Further advantageously, the first detector is positioned inside the gripping element.

Such a position provides direct contact of the first detector with the user.

According to one form, the second detector is positioned in the support or on the gripping element.

This position provides security regarding the accessibility of the second detector.

According to another form, the first detector is a capacitive sensor of a user on the gripping element.

This capacitive sensor allows sending a first signal only when the user grasps the gripping element.

The first detector can be a contact detector, a trigger, a button or a deformable micro-button.

According to yet another form, the second detector is a trigger, a button or a deformable micro-button.

This second detector allows sending a second signal thus unlocking the latch of the door leaf.

In another form, the gripping element is configured to displace from its rest position to its deployed position by a mechanism for pushing the gripping element.

In case of a malfunction of the displacement of the gripping element from its rest position to its deployed position in an electrical manner, the gripping element can be mechanically displaced.

In another form, the movement of the gripping element from its rest position to its unblocking position is a rotational or translational movement.

In yet another form, the handle includes a counterweight mechanism.

This mechanism ensures a reduction in the acceleration movement undergone by the handle during an accident for example.

In yet another form, the support includes an antenna.

In yet another form, the support includes a lighting module.

This module illuminates the gripping element in order to visualize its position.

The present disclosure also concerns a method for opening a vehicle door leaf by a handle, including the following steps:

Displacing the gripping element from a rest position to a deployed position.

Detecting a user by the first detector.

Receiving a first signal by the electric control unit in response to the detection of the presence of the user.

Detecting the displacement of the gripping element from a deployed position to an unblocking position by the second detector.

Receiving a second signal by the electric control unit in response to the detection of the displacement of the gripping element.

Unlocking an electric latch by the electric control unit in response to the reception of the second signal after reception of the first signal.

Advantageously, a time interval is defined for receiving the second signal starting from the reception of the first signal, the unlocking being triggered to the extent that the second signal is received within the time interval by the electric control unit.

This ensures a safe opening of the door leaf to the user.

Further advantageously, the time interval is less than two seconds. In one form, the time interval is less than one second. In another form, the time interval is a few milliseconds.

As used herein, a "few milliseconds" means less than 500 milliseconds and in one form can be less than 20 milliseconds.

Advantageously, the unlocking of the electric latch includes the following steps:

Displacing the gripping element from its deployed position to its unblocking position.

Maintaining the gripping element in its unblocking position.

Actuating a function for recognizing the user by the electric control unit by sending a continuous signal by the second detector.

Unlocking the electric latch in case of user recognition.

Further advantageously, when the motor vehicle is unlocked, the user recognition step is optional.

Further areas of applicability will become apparent from the description provided herein. It should be understood that the description and specific examples are intended for purposes of illustration only and are not intended to limit the scope of the present disclosure.

DRAWINGS

Figure 2:
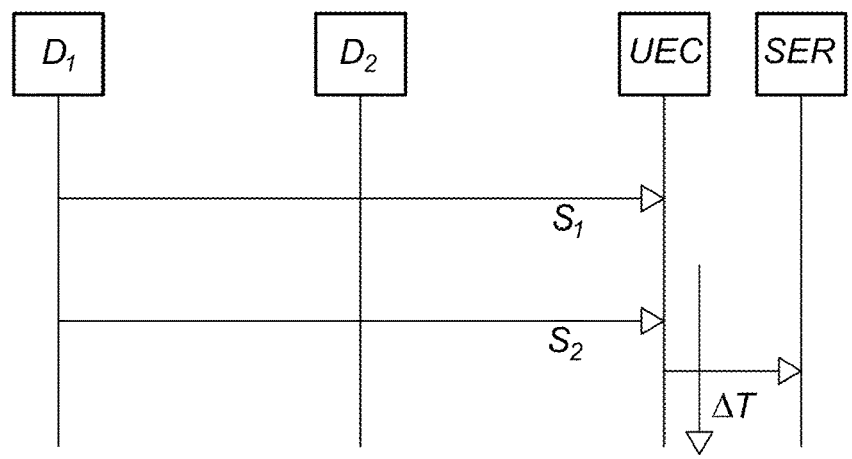

In order that the disclosure may be well understood, there will now be described various forms thereof, given by way of example, reference being made to the accompanying drawings, in which:

FIG. 1 is a schematic sectional view of a handle along a longitudinal axis, in accordance with the teachings of the present disclosure; and FIG. 2 is a flowchart illustrating the operation of a handle in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1 a door leaf 2 and handle 1 for a motor vehicle are illustrated. A gripping element 3 is shown in three different positions: a position flush with the door leaf 2 called rest position A, a deployed position B and an unblocking position C. From the rest position A to the unblocking position C, passing through the deployed position B, the gripping element 3 moves away from the door leaf 2. This gripping element 3 is configured to deviate from the door leaf 2 according to a rotational movement. It should be noted that translationally extracting the gripping element 3 is also possible.

The gripping element 3 includes a first portion 4 configured to be grasped by a user and a second portion 5 configured to be in contact with a lever 6, disposed parallel to the gripping element 3 and having an axis of rotation D. The first portion 4 has a first detector 7. In the example provided, the first detector 7 is a capacitive sensor, though other types of detectors can be used. The lever 6 includes a first end 8 linked to the second portion 5 of the gripping element 3 and a second end 9 in the shape of an arm, opposite to the first end 8. A support 10 delimits the space and includes the elements included in such a handle 1.

A second detector 11 is located against the support 10 and directed radially inwards relative to the second end in the shape of the arm 9. In the example provided, the second detector 11 is a button, though other configurations can be used. As used herein, the term "Inwards" means opposite to the door leaf 2, the latter being in contact with the outside of the motor vehicle. This second detector 11 is also disposed so as to come into contact with the second end in the shape of the arm 9 of the lever 6.

A return means 19 is arranged between the first end 8 and the second end in the shape of the arm 9 of the lever 6, and more particularly about the axis of rotation D of the lever 6. In the example provided, the return means 19 is a spring, though other configurations can be used.

The first detector 7 and the second detector 11 are each connected to a connector 12 by an electric connection, respectively 13 and 14.

This connector 12 is in turn also connected to an electric control unit 15, which in turn is connected to an electric latch 16.

An actuator 17, disposed against the support 10 and directed radially outwards relative to the second portion 5 of the gripping element 3, includes a branch 18 configured to displace according to an axis of rotation E so as to come into contact with the second portion 5 of the gripping element 3.

The possibility of setting the time of extraction of the gripping element 3 from its rest position A to its deployed position B is given. This also applies to the time of retraction of the gripping element 3 from its deployed position B to its rest position A.

Other optional and not shown elements can be integrated in such a handle 1. One non-limiting example includes lock assembled on the handle 1, opening on the outside of the motor vehicle. This lock can also be located inside the handle 1. Another non-limiting example includes a counterweight installed in the handle 1, thus reducing the acceleration movement undergone during an accident of the motor vehicle for example. Yet another non-limiting example includes an antenna implemented in the support 10, improving the quality and range of a user recognition. Still another non-limiting example includes a lighting module anchored inside the support 10, providing increased visibility to the user of the handle 1 in the dark. It is understood that these examples can be included individually or in any combination thereof and that other optional elements, not shown, can be integrated in the handle 1.

With reference to FIG. 2, the operation of the present handle 1 is described.

A user (not shown) of the motor vehicle present in a determined area, close to the motor vehicle, displaces the gripping element 3 from its rest position A to its deployed position B, in a motorized manner using a key, for example, or an application for mobile phone. The actuator 17 then displaces about its axis of rotation E until exerting a pushing force on the second portion 5 of the gripping element 3, thus causing the displacement of the gripping element 3 to its deployed position B.

It is also possible for the user to mechanically displace the gripping element 3 from its rest position A to its deployed position B, by pushing the gripping element 3 for example.

When the gripping element 3 is in its deployed position B, the user grasps the gripping element 3 sending a first signal S1 via the first detector 7, D1 and passing through the connector 12 to the electric control unit 15, UEC. The displacement of the gripping element 3 from its rest position A to its deployed position B also causes the lever 6 to displace from its passive position to its intermediate position. The intermediate position is illustrated by a contact between the second end in the shape of an arm 9 of the lever 6 and the second detector 11.

The user then pulls on the gripping element 3, so as to displace it from its deployed position B to its unblocking position C. This action, voluntarily performed by the user, causes the lever 6 to displace from its intermediate position to its active position, pressing the second detector 11, D2, thus sending a second signal S2 via the second detector 11, D2 and passing through the connector 12 to the electric control unit 15, UEC. This signal S2, after the first signal S1, allows unlocking the electric latch 16, SER and therefore opening the door leaf 2.

The return of the gripping element 3 from the deployed position B to the rest position A is performed by the return means 19.

A time interval ΔT, to receive the second signal S2, on reception of the first signal S1, is programmed according to an organization system used by the vehicle. In other words, according to the type of vehicle, a certain time interval ΔT is given to the user to send the second signal S2 starting from the sending of the first signal S1. In case of exceeding the time interval ΔT after sending the first signal S1, without sending the second signal S2, the unlocking of the electric latch 16, SER is not possible. In order to be able to unlock the electric latch 16, SER and therefore open the door leaf 2, the user restarts the procedure by sending the first signal S1 then the second signal S2, within the time interval ΔT.

It should be noted that the time interval ΔT cannot be less than the minimum time required for the electric control unit 15, UEC to confirm the information sent by the user.

In other words, the minimum time required is the time of transmission of the information sent by the user, via the first signal S1, to the electric control unit 15, UEC added to the time of reception of the confirmation of the electric control unit 15, UEC to the electric latch 16, SER.

In a case where the electric control unit 15, UEC of the vehicle is in the sleeping mode, that is to say when the vehicle is not used for a long period, the first detector 7 will not be operable and the opening of the door leaf 2 will be inoperative. In such a case, to reactivate the electric control unit 15, UEC, the second detector 11 must be biased, for example by displacing the gripping element 3 from its deployed position B to its unblocking position C.

In case of malfunction of the first detector 7, the second signal S2 cannot be sent and the opening of the door leaf 2 will not therefore be possible. A solution is proposed. Indeed, the user can overcome this problem by pulling the gripping element 3 from its deployed position B to its unblocking position C while maintaining the gripping element 3 in this unblocking position C for a few seconds. This will have the effect of maintaining the second end in the shape of an arm 9 pressed against the second detector 11, D2. A continuous signal is sent to the electric control unit 15, UEC, actuating another function of this electric control unit 15, UEC. This other function activates a recognition of the user, by looking for a connected key or a magnetic card specific to the motor vehicle for example, allowing to unlock the electric latch 16, SER of the door leaf 2 and therefore to open the door leaf 2. If the motor vehicle is already unlocked, the user recognition as previously explained is optional.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A handle for a door leaf of a motor vehicle, the handle comprising:
    a support;
    a lever;
    a gripping element fixed to the lever, the gripping element being coupled to the support and displaceable relative to the support from a rest position to a deployed position, and from the deployed position to an unblocking position;
    an electric control unit;
    a first detector configured to detect a presence of a user, and configured to send a first signal to the electric control unit in response to the detection of the presence of the user; and
    a second detector configured to detect a displacement of the gripping element from the deployed position to the unblocking position and to send a second signal in response to the detection of the displacement,
    wherein the electric control unit is configured to control unlocking of an electric latch in response to reception of the second signal after reception of the first signal,
    wherein the lever is configured to displace from a passive position, in which an arm of the lever is at a distance from the second detector to an intermediate position in which the arm is in contact with the second detector, and from the intermediate position to an active position, in which the arm exerts a force on the second detector.

2. The handle according to claim 1, wherein the electric control unit is configured to control the unlocking of the electric latch in response to the second signal being received within a defined time interval starting from the reception of the first signal.

3. The handle according to claim 1, wherein the arm of the lever is configured to displace from the passive position to the intermediate position simultaneously to the displacement of the gripping element from the rest position to the deployed position, and from the intermediate position to the active position simultaneously to the displacement of the gripping element from the deployed position to the unblocking position.

4. The handle according to claim 1, wherein the first signal and the second signal are configured to be sent to the electric control unit via an electric connector.

5. The handle according to claim 1, wherein the first detector is positioned inside the gripping element.

6. The handle according to claim 1, wherein the second detector is positioned in the support.

7. The handle according to claim 1, wherein the first detector is a capacitive sensor on the gripping element.

8. The handle according to claim 1, wherein the second detector is a trigger, a button or a deformable micro-button.

9. The handle according to claim 1, wherein the gripping element is configured to displace from the rest position to the deployed position by a mechanism configured to push the gripping element.

10. A method for opening a door leaf of a motor vehicle by a handle, the handle including a support, a lever, a gripping element, an electric control unit, a first detector, and a second detector, wherein the lever is configured to displace from a passive position, in which an arm of the lever is at a distance from the second detector to an intermediate position in which the arm is in contact with the second detector, and from the intermediate position to an active position, in which the arm exerts a force on the second detector, the method comprising:
    displacing the gripping element from a rest position to a deployed position;
    detecting a presence of a user by the first detector;
    receiving a first signal by the electric control unit in response to the detection of the presence of the user by the first detector;
    detecting a displacement of the gripping element from the deployed position to an unblocking position by the second detector;
    receiving a second signal by the electric control unit in response to the detection of the displacement of the gripping element by the second detector; and
    unlocking an electric latch by the electric control unit in response to reception of the second signal after reception of the first signal.

11. The method according to claim 10, wherein a time interval is defined for receiving the second signal starting from the reception of the first signal, wherein the unlocking is triggered in response to the second signal being received within the time interval by the electric control unit.

12. The method according to claim 11, wherein the time interval is less than two seconds.

13. The method according to claim 11, wherein the time interval is less than one second.

14. The method according to claim 11, wherein the time interval is a few milliseconds.

15. The method according to claim 10, wherein the unlocking of the electric latch comprises:
    displacing the gripping element from the deployed position to the unblocking position;
    maintaining the gripping element in the unblocking position;
    actuating a function for recognizing the user by the electric control unit by sending a continuous signal by the second detector; and unlocking the electric latch in response to user recognition.

16. The method according to claim 10, wherein the unlocking of the electric latch comprises:
displacing the gripping element from the deployed position to the unblocking position;
maintaining the gripping element in the unblocking position; and
unlocking the electric latch in response to a lock of the motor vehicle being in an unlocked state.

17. A handle for a door leaf of a motor vehicle, the handle comprising:
a support;
a lever;
a gripping element fixed to the lever, the gripping element being coupled to the support and displaceable relative to the support from a rest position to a deployed position, and from the deployed position to an unblocking position;
an electric control unit;
a first detector configured to detect a presence of a user, and configured to send a first signal to the electric control unit in response to the detection of the presence of the user; and
a second detector configured to detect a displacement of the gripping element from the deployed position to the unblocking position and to send a second signal in response to the detection of the displacement,
wherein the electric control unit is configured to control unlocking of an electric latch in response to reception of the second signal after reception of the first signal,
wherein the gripping element is configured to displace from the rest position to the deployed position by a mechanism configured to push the gripping element.

18. A method for opening a door leaf of a motor vehicle by a handle, the handle including a support, a lever, a gripping element, an electric control unit, a first detector, and a second detector, the method comprising:
displacing the gripping element from a rest position to a deployed position, wherein the gripping element is configured to displace from the rest position to the deployed position by a mechanism configured to push the gripping element;
detecting a presence of a user by the first detector;
receiving a first signal by the electric control unit in response to the detection of the presence of the user by the first detector;
detecting a displacement of the gripping element from the deployed position to an unblocking position by the second detector;
receiving a second signal by the electric control unit in response to the detection of the displacement of the gripping element by the second detector; and
unlocking an electric latch by the electric control unit in response to reception of the second signal after reception of the first signal.

* * * * *